Figure 1:
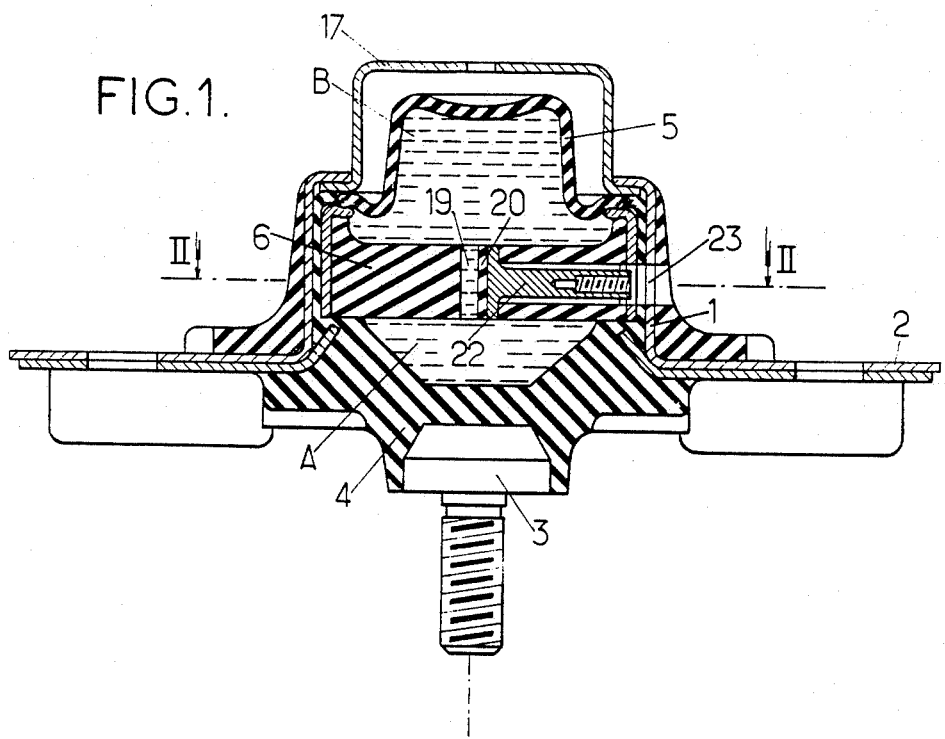

United States Patent [19]

Bellamy et al.

[11] Patent Number: 4,768,759

[45] Date of Patent: Sep. 6, 1988

[54] HYDRAULIC ANTIVIBRATORY SUPPORT FOR ENGINE WITH DEVICE FOR ADJUSTING NOZZLE CROSS-SECTION

[75] Inventors: Alain Bellamy, Vendome; Pierre Jouadë, Chateaudun, both of France

[73] Assignee: Hutchinson, Paris, France

[21] Appl. No.: 33,189

[22] Filed: Apr. 2, 1987

[30] Foreign Application Priority Data

Apr. 7, 1986 [FR] France .................. 86 04929

[51] Int. Cl.$^4$ .......................... F16F 9/14; F16F 9/50; F16F 13/00; B60K 5/12
[52] U.S. Cl. ........................... 267/140.1; 188/299; 188/319; 248/562; 248/566; 248/636; 267/219; 267/152
[58] Field of Search ............... 267/219, 217, 35, 292, 267/64.15–64.27, 121, 122, 123, 140.1–140.7, 152, 153; 248/550, 562, 566, 636, 631; 251/7–8; 138/40–46; 188/319, 299, 322.14, 298, 276; 180/300, 312; 280/714, 710, 709

[56] References Cited

U.S. PATENT DOCUMENTS

| 2,318,437 | 5/1943 | Vickers | 267/219 |
| 2,457,749 | 12/1948 | Thiry | 267/140.1 |
| 4,312,493 | 1/1982 | Stauffer | 251/8 |
| 4,391,435 | 7/1983 | Pham | 267/140.1 |
| 4,415,148 | 11/1983 | Mair et al. | 267/140.1 X |
| 4,418,897 | 11/1983 | Härtel et al. | 267/140.1 |
| 4,424,960 | 1/1984 | Dan et al. | 267/140.1 X |
| 4,635,897 | 1/1987 | Gallant | 251/7 X |

FOREIGN PATENT DOCUMENTS

| 2428326 | 1/1976 | Fed. Rep. of Germany . | |
| 5854248 | 3/1983 | Japan | 267/140.1 |
| 65635 | 4/1984 | Japan | 267/140.1 |
| 151637 | 8/1984 | Japan | 267/140.1 |

Primary Examiner—Douglas C. Butler
Attorney, Agent, or Firm—Larson and Taylor

[57] ABSTRACT

The invention provides a hydraulic antivibratory support interposed between a vehicle chassis and engine, including a work chamber (A) and a compensation chamber (B) filled with liquid and joined together through a nozzle (19) whose section, which determines the frequency of the best damped oscillations, can be modified even during operation of the support. This nozzle is defined at least partially by a deformable wall (20) and modifications of the section of the nozzle are obtained by deforming the wall.

2 Claims, 2 Drawing Sheets

HYDRAULIC ANTIVIBRATORY SUPPORT FOR ENGINE WITH DEVICE FOR ADJUSTING NOZZLE CROSS-SECTION

The invention relates to antivibratory devices intended to be interposed, for support and shock absorbing purposes, between two rigid elements individually subjected to certain oscillations or vibrations, elements such for example as a vehicle chassis and the engine of this vehicle, the shock absorbing involving the beating of a liquid mass through a restricted passage, hereafter called "nozzle", at a resonance frequency which depends on the dimensions of said nozzle and in particular upon the ratio between its axial length and its cross section.

The invention relates more particularly, among the supports of the kind in question, to those which are formed by a sealed case interposed between two rigid elements, which case includes a rigid base fixable to one of the rigid elements, a rigid ring fixable to the other rigid element, a resilient annular support wall offering good resistance to axial compression and sealingly connecting the rigid base with the rigid ring and and a flexible membrane sealingly connected to the rigid ring, the inside of the case being divided into two chambers by a separation wall, namely a work chamber situated on the resilient wall side and a compensation chamber situated on the flexible membrane side, these two chambers communicating permanently with each other through the nozzle, which is generally formed in the separation wall or around this wall, and being filled with liquid as well as this nozzle.

In known constructions, the ratio between the length and the mean diameter of the nozzle, between 2 and 100, is generally determined once and for all as a function of the frequency F of the oscillations which it is desired to absorb to a maximum.

Such a formula has the drawback that said frequency F is the only one: in other words, if it is a question of damping the vibrations of an engine whose frequency varies from 50 to 200 Hz depending on the operating conditions of this engine, the supports considered only provide good shock absorption for one F of the values of this range of frequencies and for the values closely related to F, but not for the other values.

To overcome this drawback, it has already been proposed to modify the ratio between the length and section of the nozzle, while the support is in operation, so as to bring the tuning frequency F corresponding to maximum damping of the support close to the real frequency G of the main oscillations to be damped.

It has even been proposed making these two frequencies F and G automatically equal to all times by providing means for detecting the frequency of the real oscillations imposed on the support and means for automatically modifying the above length/section ratio depending on the result of such protection.

It it to these supports which are adjustable during their very operation, that is to say after positioning thereof between the rigid supporting element and the rigid supported element, that the present invention is directed, both in the case where the adjustment considered is provided automatically and in the case where it is provided manually.

In known embodiments of these adjustable supports, the length/section ratio of the nozzle is modified by closing to a greater or lesser degree a section of this passage forming a rigid annular seat by a rigid valve moved axially opposite said seat.

Experiments carried out with these rigid valve constructions have not given satisfaction for reasons which are not completely clear and among which may be mentioned difficulty in accurately positioning the rigid vibrating valve through a chain of kinematic elements itself subjected to vibrations.

The aim of the present invention is especially to overcome these drawbacks.

For this, the hydraulic antivibratory supports of the kind considered are essentially characterized in accordance with the invention in that the nozzle is defined at least partially by a deformable wall and in that the means for modifying the length/section ratio of said nozzle are adapted so as to deform said wall.

In advantageous embodiments, recourse is further had to one and/or the other of the following arrangements:

the deformable wall is formed by a part of the separation wall, then made from an elastomer material, and the adjustment means include a rigid tie rod connecting a point of this wall to a control member external to the support, the deformable wall forms part of a sealed pocket and the adjustment means are adapted so as to connect this pocket to a fluid source subjected to an adjustable pressure or depression, which source is external to the support, in a support according to the preceding paragraph, the pocket is a sealed flexible tube which extends through a passage formed in the separation wall.

The invention includes, apart from these main arrangements, certain other arrangements which are preferably used at the same time and which will be more explicitly discussed hereafter.

In what follows, some embodiments of the invention will be described with reference to the accompanying drawings in a way which is of course in no wise limitative.

Figure 2:
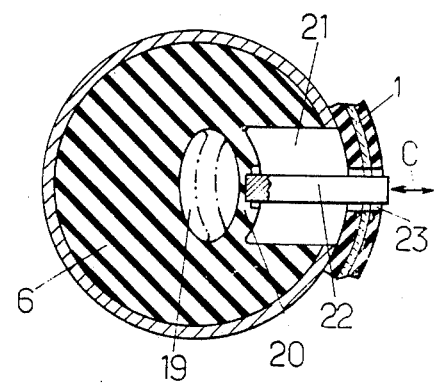

FIGS. 1 and 2, of these drawings, show respectively in axial section and in partial cross section through II—II of FIG. 1, a hydraulic antivibratory support constructed in accordance with the invention.

Figure 4:
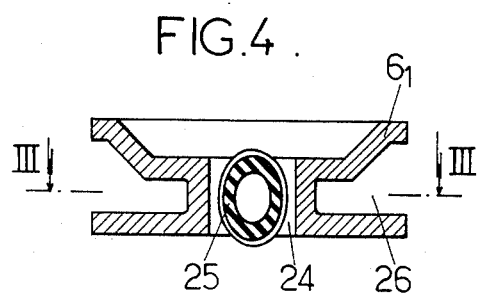
Figure 3:
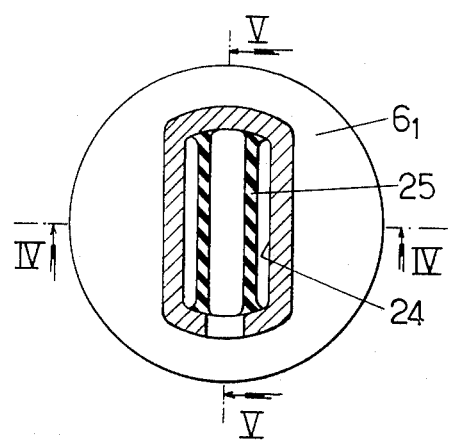
Figure 5:
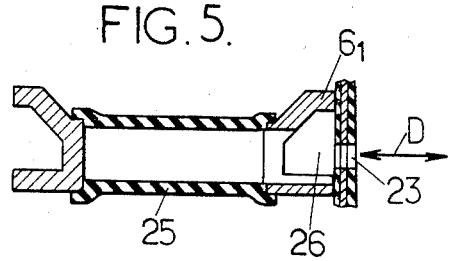
Figure 6:
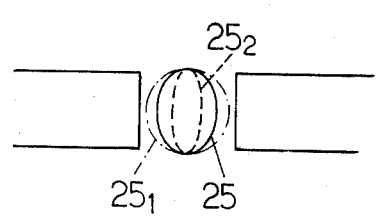

FIGS. 3, 4 and 5 show respectively in cross section through III—III in FIG. 4 and in axial sections through IV—IV and V—V of FIG. 3, the portion of a variant of such a support also in accordance with the invention, and FIG. 6 is a diagram for explaining the operation of this latter support.

In each case, the support considered is intended to be interposed between a rigid supporting member such as a vehicle chassis and a rigid supported member such as an internal combustion engine.

This support has the general shape of a sealed case of revolution about an axis and including, in a way known per se:

an annular frame 1 extended radially by two apertured lugs 2 fixable to the supporting member by bolting, a rigid body 3 having the form of a bolt whose threaded portion extends downwardly, which bolt is fixable to the supporting member, a thick and sealed truncated cone shaped wall 4 made from an elastomer material adhered respectively to the frame 1 and to body 3 and adapted for resiliently resisting the axial compression and transverse flexion, and a sealed flexible membrane 5 whose periphery is sealingly fixed to the annular frame 1.

A sealed dividing wall 6 divides the inside of the case into two chambers A and B both filled with liquid, namely a working chamber A disposed on wall 4 side and a compensation chamber B disposed on the membrane 5 side.

A metal protection cap 17, whose edge is fixed to the annular frame 1, surrounds the membrane 5.

In the embodiment shown schematically in FIGS. 1 and 2, the dividing wall 6 is formed by a cylindrical block of elastomer material formed in its central zone with a cylindrical nozzle 19.

The generatrices of the cylinder defining this nozzle are parallel to the axis of the support and its cross section has an elongate shape varying between an ellipse (shown with a continuous line in FIG. 2) and a bean (dot dash lines).

To this end, one of the elongate faces defining the nozzle defines a thinned down elastomer wall 20 forming part of block 6.

In other words, a pocket 21 is hollowed out in this block so as to form this thinned down wall 20.

Inside this pocket is housed a rigid tie rod 22 a widened end of which is adhered to wall 20 and the other end of which is connected to an external control member such as a Bowden type cable, shown schematically by the symbol C.

This member C passes through apertures 23 formed laterally in the support without adversely affecting the sealing of the two liquid filter chambers of this support.

By acting on member C, the cross section of nozzle 19 can be varied and so the resonance frequency F corresponding to the mass of liquid contained in this nozzle.

Now, as mentioned above, among the vibrations or oscillations imposed on the support, it is precisely those whose frequency is equal to said value F which are damped or filtered to a maximum by said support, since it is they which cause the resonance of the liquid mass considered, present in the nozzle.

Thus an extremely simple and flexible means is obtained for modifying said frequency F depending on the needs.

In the variant shown in FIGS. 3 to 6, the intermediate dividing wall, here designated by the reference $6_1$, is rigid and it is formed axially with a passage 24 of relatively large section.

This passage is obstructed transversely by a resilient tube section 25 one end of which is sealingly closed by a surface forming part of dividing wall $6_1$ and the other end of which is sealingly connected to an external source of a fluid able to be subjected to an adjustable pressure.

This connection is here provided through:

an annular chamber 26 formed inside the dividing wall $6_1$, and lateral apertures 23 formed in the support as for the preceding embodiment.

By acting on the external member—shown schematically by the symbol D—for adjusting the pressure of the fluid contained in tube 25, the degree of inflation of this tube is modified and so the residual section S of the nozzle or restricted passage connecting the two chambers of the support together, said nozzle being formed by the portion of passage 24 not occupied by tube 25.

This section S is all the greater the lower said pressure and conversely: in FIG. 6, the profile shown with a dash dot line $25_1$ of the inflated tube corresponds to a small section S of the nozzle and, on the contrary, the profile of the deflated tube shown with broken lines $25_2$ corresponds to a large section S.

As before, the frequency F of the beating to be controlled is again related to said section S.

Tube 25 is advantageously chosen so that the deformations thereof as a function of the inflation pressure are oriented perpendicularly to the flow direction of the liquid through the nozzle.

For adjusting the degree of inflation of tube 25, this tube 25 may be caused to communicate in turn with an external pressurized fluid source and with a duct for discharging this fluid or for returning said fluid to the source. The external source may also be a depression or "vacuum" source.

In each case, the adjustment of the section of the nozzle may be made dependent on the frequency of the oscillations to be damped.

For this, means may be provided for detecting at all times the real frequency of the oscillations imposed on the support and for controlling the adjustment means by the value thus detected for this real frequency.

In the embodiments in which the support is intended to damp the vibrations of an engine, the above frequency detection is advantageously obtained by detecting the speed of rotation of the drive shaft by means of an appropriate tachometer or revolution counter. But it could also be provided indirectly, by basing it on the variations of a parameter related to said speed such for example as the depression reigning in the intake manifold of the engine.

Following which and whatever the embodiment adopted, a hydraulic antivibratory support is obtained able to be adapted for damping oscillations of different frequencies, even during operation, so as to take into account the real instantaneous needs.

Following which, and as it follows moreover from what has gone before, the invention is in no wise limited to those of its modes of application and embodiments which have been especially considered; it embraces, on the contrary, all variants thereof.

We claim:

1. An antivibratory device which is interposed between two rigid elements for support and damping comprising:
   a sealed case interposed between the two rigid elements, said sealed case including
   (a) a rigid base fixable to one of the rigid elements,
   (b) a rigid ring fixable to the other rigid element,
   (c) a resilient annular support wall offering good resistance to compression between the two rigid elements and sealingly connecting said rigid ring to said rigid base,
   (d) a flexible membrane sealingly connected to said rigid ring, and
   (e) a separation wall dividing an inside of said case into two chambers, a work chamber situated between said resilient annular support wall and said separation wall and a compensation chamber situated between said flexible membrane and said separation wall;
   a nozzle through which said work chamber and said compensation chamber communicate, said nozzle including a deformable wall whereby a cross section of said nozzle can be modified;
   a liquid which fills said work chamber, said compensation chamber, and said nozzle; and an adjusting means for adjusting the cross section of said nozzle by deforming said deformable wall even during the operation of said antivibratory device, said adjustment means includes a rigid tie rod which directly connects a part of said deformable wall with a control member external to said case.

2. A device according to claim 1 wherein said deformable wall is a portion of said separation wall, and said separation wall is made of an elastomer material.

* * * * *